United States Patent [19]

Blessinger

[11] Patent Number: 5,196,938
[45] Date of Patent: Mar. 23, 1993

[54] SOLID STATE FAST FRAME RECORDER HAVING INDEPENDENTLY SELECTABLE FRAME RATE AND EXPOSURE

[75] Inventor: Kurt V. Blessinger, Vista, Calif.

[73] Assignee: Eastman Kodak Company, Rochester, N.Y.

[21] Appl. No.: 439,226

[22] Filed: Nov. 20, 1989

[51] Int. Cl.$^5$ .............................................. H04N 5/30
[52] U.S. Cl. .................................. 358/209; 358/213.19
[58] Field of Search .................... 358/160, 213.13, 93, 358/152, 209, 213.25, 213.26, 213.19, 213.16

[56] References Cited

U.S. PATENT DOCUMENTS 2,943,141  6/1960  Knight .
4,280,151  7/1981  Tsunekawa et al. .
4,420,773  12/1983  Toyoda et al. .
4,456,931  6/1984  Toyoda et al. .
4,489,351  12/1984  d'Aloyer de Costemore D'Arc .
4,496,995  1/1985  Colles et al. .
4,593,313  6/1986  Nagasaki et al. .
4,630,111  12/1986  Blain et al. .
4,785,353  11/1988  Seim ............................. 358/213.26
4,837,628  6/1989  Sasaki .
4,910,596  3/1990  Kieff ................................... 358/160

FOREIGN PATENT DOCUMENTS 0279549  8/1988  European Pat. Off. .
0140074  8/1982  Japan ............................... 358/213.19
0004777  10/1985  PCT Int'l Appl. ................. 358/152

OTHER PUBLICATIONS

Mayes et al., "High Speed Image Capture for Mechanical Analysis" IBM Technical Disclosure vol. 16, No. 7, Dec. 1973 pp. 2169-2171.
Hyzer, William G "High-Speed Video System provides Instant Images" Industrial Research & Development Feb. 1981, pp. 180-185.

Primary Examiner—James J. Groody
Assistant Examiner—David E. Harvey
Attorney, Agent, or Firm—William F. Noval

[57] ABSTRACT

A fast frame recorder which records images of an event at a fast frame rate and plays back the images at a slower frame rate to facilitate analysis of the event. The fast frame recorder includes a solid state imager and solid state memory for recording image frames captured by the imager. The exposure time and frame rate of the recorder are independently selectable, as long as exposure time does not exceed 1/frame rate.

7 Claims, 4 Drawing Sheets

SOLID STATE FAST FRAME RECORDER HAVING INDEPENDENTLY SELECTABLE FRAME RATE AND EXPOSURE

BACKGROUND OF THE INVENTION

This invention relates in general to a fast frame recorder which records an event at a fast frame rate and plays back the event at a slower frame rate so that the event may be analyzed. More particularly, this invention relates to a fast frame recorder which includes a solid state imager and solid state memory and which has independently selectable frame rate and exposure.

Fast frame recorders are useful for motion analysis of an event. A fast frame recorder records a great number of images during an event at a high or fast image frame rate and reproduces the image frames more slowly at a lower frame rate. Thus, any movement occurring during the event may be analyzed in a step-by-step progression. Applications for a fast frame recorder include, malfunctions in high speed machinery, movements of an athlete, testing of safety equipment, shattering an object, etc. One type of fast frame recorder is disclosed in commonly assigned U.S. Pat. No. 4,496,995, issued Jan. 29, 1985. As disclosed in the latter patent, the fast frame recorder-motion analyzer includes a video camera, a variable speed magnetic tape processor and a video display monitor. The camera is read out in block format so that a plurality of lines of video information that correspond to rows of photosites in the camera solid state imager are simultaneously recorded on magnetic tape in parallel longitudinal tracks. During play back, the magnetic tape is played back at a reduced tape speed. A plurality of parallel video signals reproduced from a plurality of parallel tracks on the tape, are processed into a serial video signal which may be used with standard video monitors. Although a magnetic tape, fast frame recorder is advantageous because of its ability to record a large number of image frames and because of the non-volatility of the image storage, there are limitations to magnetic tape recording. Such a fast frame recorder tends to be costly since, in recording and reproducing a plurality of parallel video signals, separate record and reproduce signal processing circuitry must be provided for each video signal channel. Since the video signals are recorded directly on magnetic tape in an analog format, picture quality is degraded significantly due to induced flutter and other noise, due to reduced bandwidth and increased phase distortion and due to imprecisely recorded pixel signal values.

Flutter is the change in video signal caused by variations of tape speed relative to the record and playback magnetic heads. Flutter displays itself on a video monitor as vertical bands of light and dark superimposed over the video. These bands tend to change intensity and position and appear to flutter about the screen during playback. The degree of flutter caused during playback directly effects the intensity and degree of annoyance of light and dark bands of the video display. The degree of flutter will vary from recorder to recorder because of the sensitivity to mechanical tolerance buildup, tape and transport wear and environment. Large amounts of flutter will be introduced when the magnetic tape transport is subjected to shock or vibration during recording or playback.

Besides the image degradation caused by flutter, there are other types of noise that effect the quality of video in a magnetic tape recording system. Tape media has a graininess associated with it that will limit the dynamic range of a recorded analog signal. This graininess can be associated with hiss or snow as displayed on a monitor. Moreover, imperfections in the tape media known as dropouts will result in gaps of missing video. These gaps can be anywhere from a small segment of an image frame to many image frames in size. In addition, electronic noise is injected into a video signal because of analog recording. This particular type of noise is significant and difficult to reduce because of the low level of analog signals being processed. Electronic noise also appears as snow on a monitor and adds to the overall snow content present. As the snow content becomes larger relative to the picture information, there is a reduction in contrast of the pictures.

Limited bandwidth and phase distortion result from trying to get the highest possible frame record rate given the limitations of the write rate and tape speed. This distortion shows on the monitor as a blurring or smearing of image boundaries that are vertically oriented and is particularly evident at extreme edge transitions of black to white or white to black.

Magnetic tape fast frame recorders are also limited because frame exposure is inherently a function of frame rate. Frame exposure is the length of time that an imager is exposed to an image of an event. As exposure time is increased, correct exposure can be effected with less light. However, longer exposure times result in increased motion blur of a captured frame. Frame rate is the number of image frames per second captured and stored on tape. Thus, as frame rate is increased, information content of an event is increased, but the window of time that can be captured is decreased.

SUMMARY OF THE INVENTION

According to the present invention, there is provided a fast frame recorder which minimizes the limitations of magnetic tape fast frame recorders. According to an aspect of the present invention, a fast frame recorder includes solid state memory for storing a plurality of image frames produced by a solid state image sensor wherein picture degradation produced by flutter of a magnetic tape fast frame recorder is eliminated and wherein dropouts are minimized to single pixel events. According to another aspect of the present invention, video information representing image frames are recorded in digital format in the solid state memory, thus inherently eliminating media noise and electronic noise associated with tape recording. Moreover, bandwidth limitations and phase distortion produced in magnetic tape recording systems is minimized by digital storage of image frames. The solid state fast frame recorder of the present invention is substantially immune to shock and vibration and to environmental conditions such as temperature and humidity.

According to a further aspect of the present invention, a solid state fast frame recorder is provided which includes a solid state imager and solid state memory. Exposure time and frame rate are independently selectable as long as exposure time does not exceed 1/frame rate.

DESCRIPTION OF THE DRAWINGS

In a detailed description of a preferred embodiment of the invention presented below, reference is made to the accompanying drawings in which like numerals refer to like elements.

DETAILED DESCRIPTION OF THE PREFERRED EMBODIMENT

Figure 1:
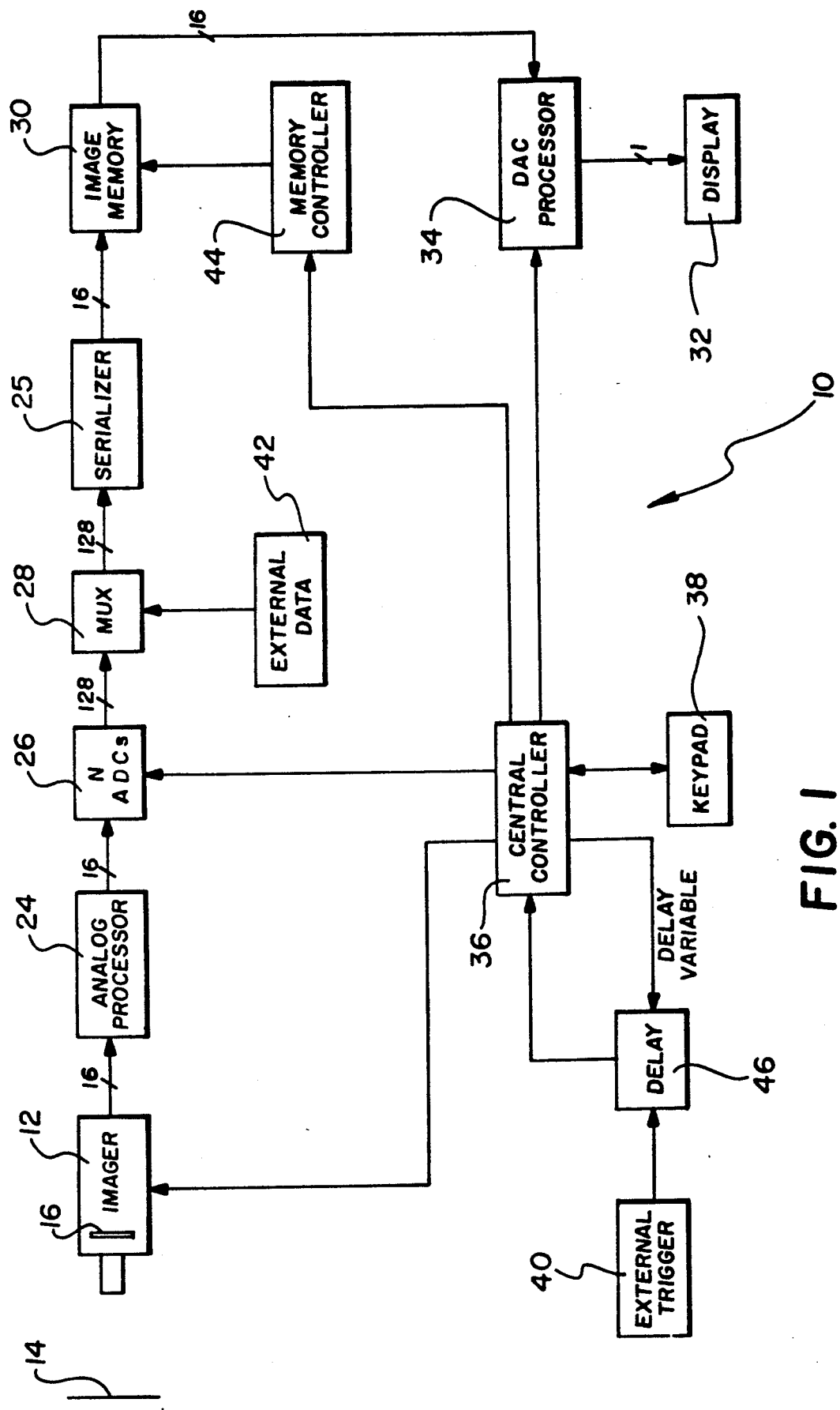
FIG. 1 is a block diagram of a preferred embodiment of the solid state fast frame recorder of the present invention.

Referring now to FIG. 1, there will be described a preferred embodiment of the solid state fast frame recorder of the present invention. As shown in FIG. 1, fast frame recorder 10 includes solid state imager 12 which images an event, such as scene 14, by means of a solid state, area imager 16. Imager 12 is controlled by central controller circuit 36 which supplies suitable control signals to imager 12 as a function of operator selectable frame rate parameters. Imager 12 may operate, for example, at frame rates of 1 to 1,000 frames per second.

Figure 2:
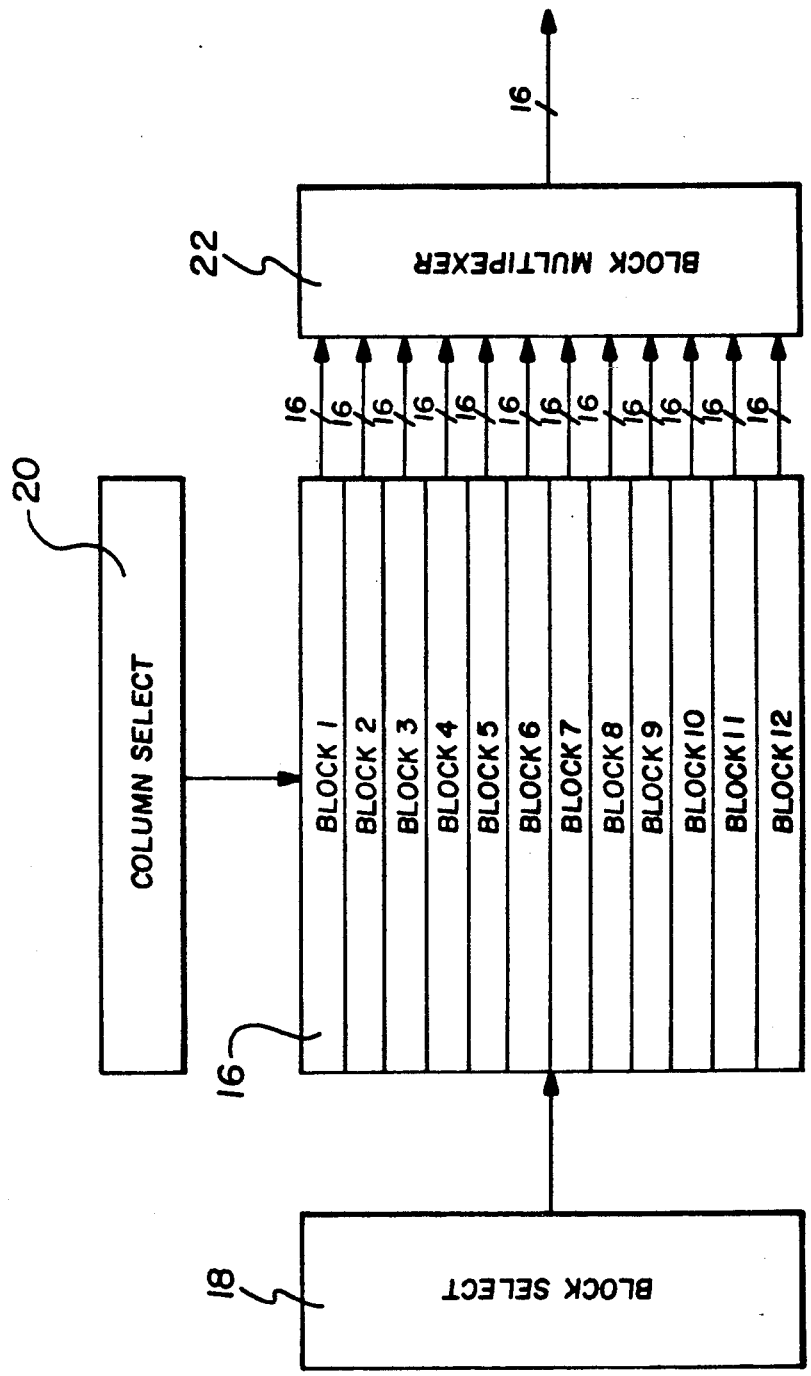
FIG. 2 is a functional block schematic diagram of a block readable image sensor.

Image sensor 16 is preferably a block "readable" area image sensor. The basic concept of a block readout of a solid state area image sensor and the timing and control thereof is disclosed in U.S. Pat. No. 4,322,752 in the name of James A. Bixby. Although the referenced patent provides detailed information, a brief description of the concept of block readout may be illustrated with respect to FIG. 2. FIG. 2 shows a block readable sensor 16 that includes an array of photosites (not individually shown) arranged in rows and columns. For purposes of readout, sensor 16 is schematically shown as being formatted into 12 blocks of 16 photosite rows in each block. Through appropriate control circuitry including block select circuit 18 and column select circuit 20, blocks 1-12 of sensor 16 are sequentially read out as parallel rows of photosites to block multiplexer circuit 22. Multiplexer 22 produces an image frame signal which includes sequential blocks of video information wherein each block of video information includes (16) parallel lines of video signals.

The parallel lines of video signals from multiplexer 22 are amplified and conditioned in analog processor 24 for preparation to be digitized. These parallel analog signals from analog processor 24 are converted into digital signals in ADC 26 by an Analog to Digital converter on each parallel signal line. Each ADC will output n parallel signal lines where n is equal to it's bit conversion size. Therefore, the number of output lines of ADC 26 will be n times the number of parallel lines of video signals. For example, if the number N of parallel video signals is "16" and the bit conversation number n is "8", the number of signal lines from ADC 26 is "128".

The multiplicity of signal lines from ADC 26 are converted to a more manageable number by the serializer 25. The serializer takes the n parallel lines associated with each ADC and converts the information on them into a bit serial format on one line. Therefore in this example, after serialization, there are the same number of parallel digital signal lines as there are parallel analog signal lines.

External data signals from source 42 are temporally associated with an image frame by inserting them in multiplexer 28 as a header or trailer with the image frame signals from ADC 26. These combined signals are then serialized in serializer 25 and stored in an image frame location in solid state image memory 30.

Image memory 30 is made up of a number of solid state Random Access Memory devices such as DRAMs or SRAMs. Inherently, to store information in RAM, a location needs to be addressed and then the information written to their input port. Subsequently, to retrieve the information back the location is re-addressed and then the information is read from the output port. Memory controller 44 is used to give order to the random access capability of RAM. When recording, it generates the address signals to the RAM in a known, fixed sequential format. Most importantly, this format is circular; once Image Memory 30 is full (can not store another image frame in a unique location), memory controller 44 repeats the sequence of address signals thereby recording the newest image frame over the oldest. Visual analysis is accomplished when, during playback, the address signals are repeated in the same sequential format, but at a slower rate while Memory 30 is read.

Memory 30 may have a storage capacity of any size but should be large enough to store a sufficient number of image frames to capture an event in totality for later analysis. As an example, if an image frame plus external data information forms a display matrix of 256×256 pixels and each pixel is represented by 8 bits of information, each image frame stored in memory 30 occupies approximately 65 kilobytes of memory. If 1000 image frames were to be stored, then memory 30 must have approximately 65 megabytes of solid state memory storage.

Image frames stored in memory 30 are displayed on monitor 32 by converting the digital image frame signal into an analog image frame signal by means of digital to analog converter processor (DAC) 34. Processor 34 extracts external data and displays them in a border around the image frame on display monitor 32. Central controller circuit 36 controls image memory 30 and processor 34 to vary the frame rate of playback on display monitor 32.

Key pad 38 has suitable switches and controls to input data into control circuit 36 to control the operation of fast frame recorder 10. Fast frame recorder 10 is operable in a preevent/postevent trigger recording mode. Thus, recorder 10 continuously records (in a circular or FIFO (First In, First Out) format) image frames of an event produced by imager 12. When memory 30 is full, new image frames produced by imager 12 are recorded over the oldest image frames in memory 30. In order to stop recording, external trigger circuit 40 produces a trigger signal in response to an external event to stop recorder 10 from storing image frames in memory 30. Trigger 40 detects physical phenomena unique to the event to be recorded. At the time fast frame recorder 10 is triggered to stop, memory 30 will hold the sequence of image frames that depict the event prior to the trigger. As the image frames captured in memory 30 are played back on display monitor 32 in reverse order of recording, the event is played back in time, until the image frame where the trigger occurred is repeated.

A variable delay is provided by delay circuit 46 to stop recording after a trigger signal is produced by external trigger 40. Thus, a variable number of image frames before and after the triggering event may be recorded in memory 30.

Figure 4:
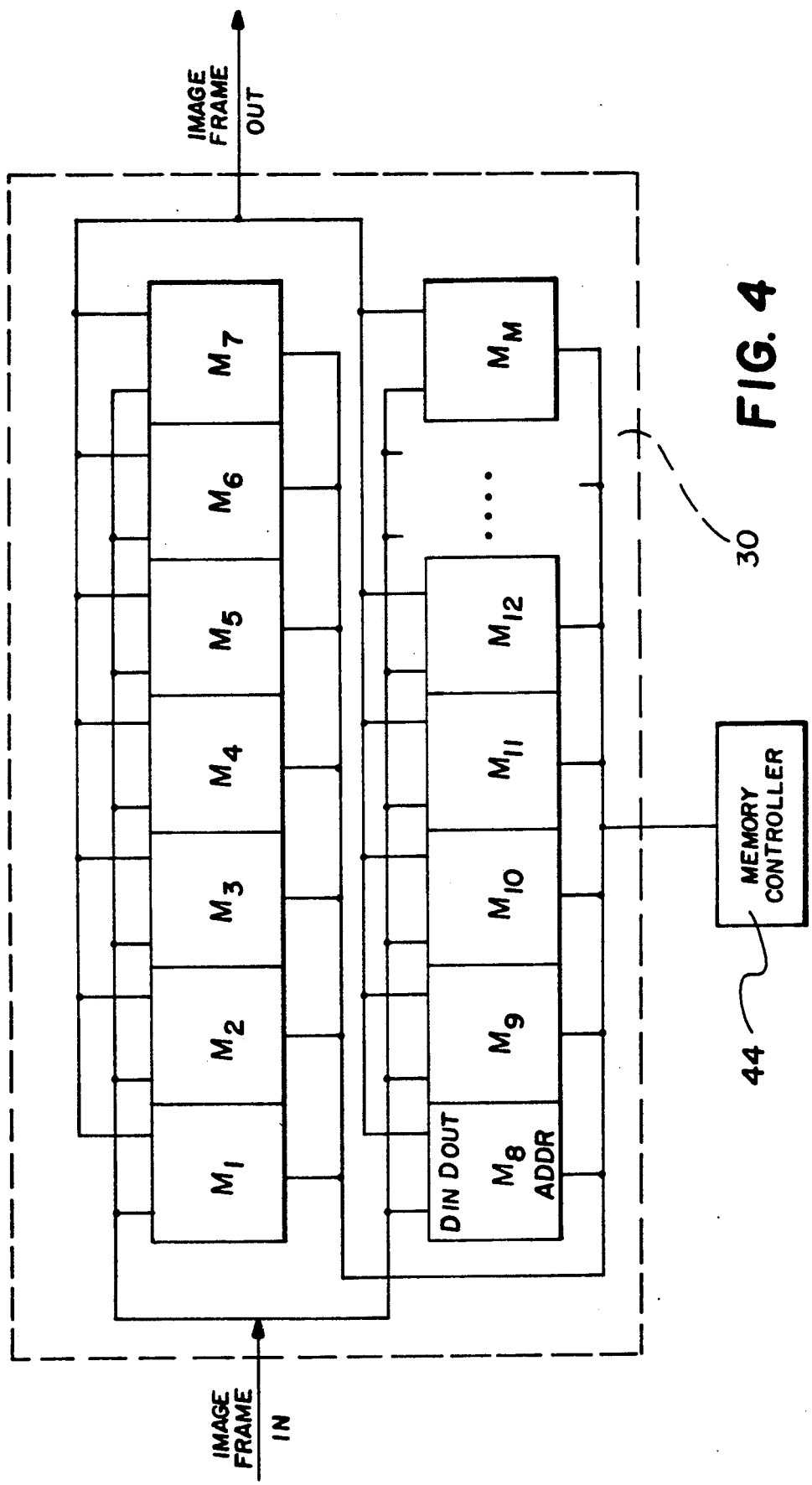
FIG. 4 is a functional block schematic diagram of the solid state memory of the embodiment of FIG. 1.

In FIG. 4, memory 30 is shown as comprising M image frame locations numbered $M_1$ to $M_M$.

According to the present invention fast frame recorder 10 has independently selectable exposure time and frame rate. Sensor 16 of imager 12 can be read out at a plurality of different frame rates. Exposure time is the time sensor 16 is exposed to a scene (event) and is a function of the sensor frame rate. Thus, if sensor 16 is read out at 1000 frames per second (FPS), exposure time is 1/1000 second; if sensor 16 is read out at 50 FPS, exposure time is 1/50 second.

Because magnetic tape fast frame recorders inherently make frame exposure time a function of the recorded frame rate, if the recorded frame rate is selected to be 30 FPS, the exposure must be 1/30 second. Although the slower frame rate may be selected to increase the window of time of an event to be captured, a faster exposure time may be desirable in order to reduce motion blur. Thus, magnetic tape recorders necessitate a compromise between recording time and motion blur requirements.

The solid state fast frame recorder of the present invention does not have this restriction. The exposure time can be independently selected from the recorded frame rate. The only restriction is that imager exposure time does not exceed 1/frame rate. Thus, for a frame rate of 1000 frames per second (FPS) the exposure time must be at least 1/1000 second. For 50 FPS, the exposure time can be 1/50, 1/100, 1/250, down to 1/1000 second. At lower frame rates, this capability allows the user to eliminate motion blur, but to increase recording time of an event.

Figure 3A:
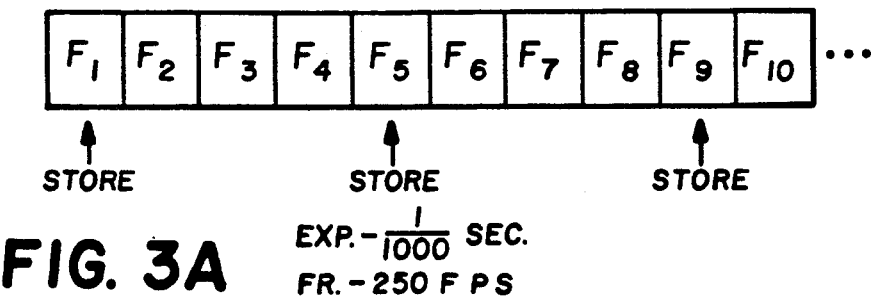
FIGS. 3A, 3, 3C, 3D and 3E are diagrammatic showings useful in describing the operation of the embodiment of FIG. 1.

Referring now to FIGS. 3A-3E, the independently selectable exposure and frame rate functions of fast frame recorder 10 will be explained. The exposure time of sensor 16 of imager 12 is a function of the imager frame rate. However, the imager frame rate of solid state fast frame recorder 10 is independently selectable from the recorded frame rate. Thus, whereas a magnetic tape fast frame recorder records on magnetic tape all of the image frames produced by the imager (the recorded frame rate equals the imager frame rate); solid state recorder 10 can record in solid state memory 30 less than all of the image frames produced by imager 12 (the recorded frame rate can be less than the imager frame rate). As illustrated in FIG. 3A, recorder 10 is operated at an exposure time of 1/1000 second and a frame rate of 250 FPS. Although the frame rate of imager 12 is 1000 FPS, only one out of every four image frames produced by imager 12 is stored (recorded) in image memory 30. Thus, as shown, only image frames $F_1$, $F_5$, $F_9$, etc. are stored in memory 30.

Figure 3B:
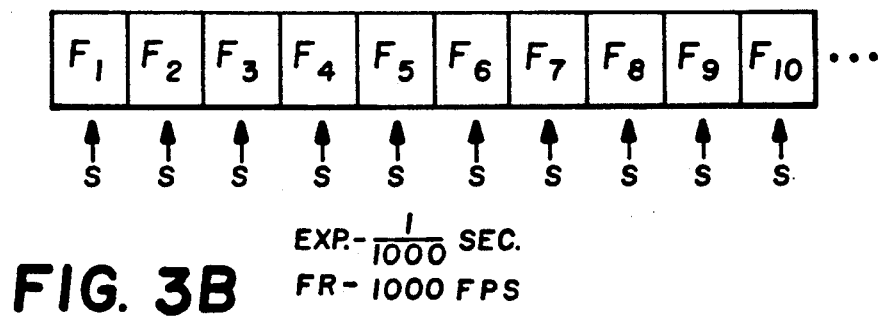

As illustrated in FIG. 3B, recorder 10 is operated at an exposure time of 1/1000 sec. and a frame rate of 1000 FPS. Since the recorded frame rate is equal to the imager frame rate, all of the image frames (i.e., $F_1$, $F_2$, ..., $F_{10}$) produced by imager 12 are stored in image memory 30.

Figure 3C:
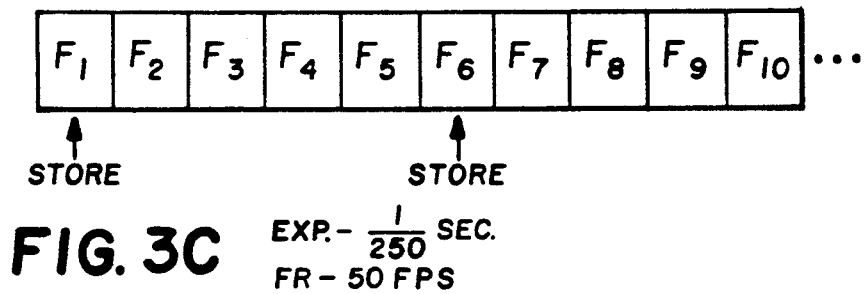
Figure 3D:
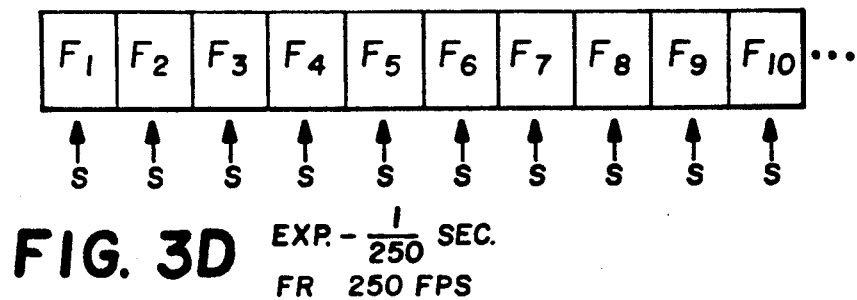
Figure 3E:
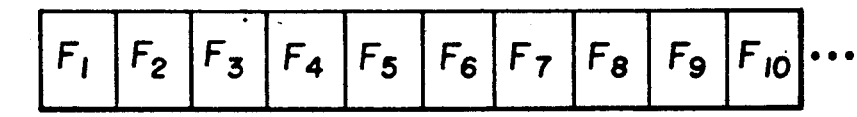

FIGS. 3C, 3D, and 3E illustrate the cases where the exposure time is less than, equal to, and greater than 1/frame rate. As illustrated in FIG. 3C, the exposure time is 1/250 sec. and the frame rate is 50 FPS (i.e., exposure time of 1/250 is less than 1/frame rate or 1/50). Therefore, one of every five image frames (e.g., $F_1$, $F_6$, ...) produced by imager 12 are stored in image memory 30. As illustrated in FIG. 3D, the exposure time is 1/250 sec. and the frame rate is 250 FPS. Therefore, all of the image frames (e.g., $F_1$, $F_2$, $F_3$, ...) produced by imager 12 are stored in image memory 30.

FIG. 3E illustrates the exception to the independent selectability of exposure and frame rate. Since the selected exposure time 1/250 is greater than the inverse of the selected frame rate of 1000 FPS or 1/1000, recorder 10 cannot operate at these user selected parameters. The user must then select an exposure time and frame rate which are compatible.

Although a preferred embodiment of the present invention has been described above, variations and modifications thereof will be evident to one skilled in the art. Thus, for example, recorder 10 can operate at any frame rate and exposure time than those explained above.

Although the invention has been described in detail with particular reference to a preferred embodiment thereof, it will be understood that variations and modifications can be effected within the spirit and scope of the invention as described above and as defined in the appended claims.

What is claimed is:

1. A solid state fast frame recorder comprising:
    solid state imager means for capturing images of an event and for producing image frame signals corresponding to said captured images;
    means for selectively operating said imager means at different imager frame rates, wherein said exposure time of a captured image is equal to the reciprocal of the imager frame rate;
    solid state memory means for storing image frame signals produced by said imager means; and
    means for independently selecting said memory means to operate at a frame rate which is equal to or is a submultiple of said imager frame rate such that when said memory means is operated at a frame rate less than said imager means frame rate, said memory means stores only some of the image frame signals produced by said imager means.

2. The solid state fast frame recorder of claim 1 wherein said imager means is selectively operated at a frame rate F and exposure time 1/F; and wherein said memory means is selectively operated at a frame rate F/n, where n is a positive integer equal to or greater than one.

3. A fast frame recorder comprising:
    solid state imager means, having a plurality of photosites arranged in an array of rows and columns, for capturing an image of an event and for producing an image frame signal corresponding to said captured image by reading out blocks of parallel rows of photosites,
    said image frame signal including sequential blocks of video information, wherein each block of video information includes parallel lines of video signals;
    means for selectively reading out said integer means at different imager frame rates, wherein said exposure time of a captured image is equal to the reciprocal of the imager frame rate;
    solid state memory means for storing a plurality of image frame signals produced by said imager means; and
    means for independently selecting said memory means to operate at a frame rate which is equal or is a submultiple of said imager frame rate such that when said memory means is operated at a frame rate less than said imager means frame rate, said memory means stores only some of the image frame signals produced by said imager means.

4. The recorder of claim 3 wherein said imager means is selectively operated at a frame rate F and exposure time 1/F; and wherein said memory mean sis selectively operated at a frame rate F/n, where n is a positive integer equal to or greater than one.

5. The recorder of claim 3 wherein said imager means is selectively operated at a frame rate of F frames per second for producing F image frame signals per second and wherein said solid state memory means is selectively operated (a) at a frame rate which is equal to said imager frame rate in which all of the image frame signals are stored in said memory means, or (b) at a frame rate F/n which is a submultiple of said imager frame rate, where n is a positive integer greater than one, such that F/n image frame signals per second are stored in said memory means.

6. The recorder of claim 5 wherein when said memory means is operated at said frame rate F/n, one of every n frames produced by said imager means is stored in said memory means.

7. A solid state fast frame recorder comprising:
   solid state imager means for capturing images of an event and for producing a sequence of image frame signals corresponding to said captured images;
   solid state memory means coupled to said imager means for storing image frame signals produced by said imager means; and
   control means for selectively controlling said imager means to operate at a frame rate F to produce F image frame signals per second and for selectively controlling said memory means to operate at a frame rate F/m, where m is a positive integer greater than 1 and to store each F/m image frame signal produced by said imager means so that F/m image frame signals are stored per second and F-F/m image frame signals per second produced by said imager means are not stored by said memory means.

* * * * *